United States Patent [19]
Bettini

[11] Patent Number: 5,769,502
[45] Date of Patent: Jun. 23, 1998

[54] LEVELING SYSTEM FOR MOTOR VEHICLES

[76] Inventor: Marco Bettini, 40010 Bentivoglio (Bologna) Fr., San Marino, Italy

[21] Appl. No.: 652,806

[22] Filed: May 23, 1996

[51] Int. Cl.$^6$ ............................................ B60P 1/16
[52] U.S. Cl. .................... 298/175; 280/6.12; 298/22 C
[58] Field of Search ............................... 180/41; 280/6.1, 280/6.12, 840; 298/22 C, 175

[56] References Cited

U.S. PATENT DOCUMENTS

| 4,036,528 | 7/1977 | Langendorf | 298/175 |
| 4,261,616 | 4/1981 | Beegle | 298/175 |

FOREIGN PATENT DOCUMENTS

| 2 694 730 | 2/1994 | France . | |
| 26 52 854 | 5/1978 | Germany . | |
| 2-28053 | 1/1990 | Japan | 280/6.12 |
| 605 202 | 9/1978 | Switzerland . | |
| 2 046 957 | 11/1980 | United Kingdom . | |
| 2 174 649 | 11/1986 | United Kingdom . | |
| 2202497 | 9/1988 | United Kingdom | 298/175 |

*Primary Examiner*—Janice L. Krizek
*Attorney, Agent, or Firm*—Fay, Sharpe, Beall, Fagan, Minnich & McKee

[57] ABSTRACT

The present invention relates to a levelling system for motor vehicles which allows the shaft that hinges a truck body or other loading surface defining a loading structure, to an auxiliary frame defining, or forming part of, the vehicle's supporting structure, to remain horizontal so as to enable the body or loading surface to be used effectively; the levelling system basically includes a device for detecting the inclination of the hinge shaft to the horizontal and a mechanism for adjusting the inclination consisting of a bracket or lever placed between the supporting structure and the loading structure, pivoted to a second shaft and operated on by at least two variable extension elements connected to the supporting structure and designed to vary the inclination of the latter in accordance with the readings of the detecting a mechanism.

16 Claims, 4 Drawing Sheets

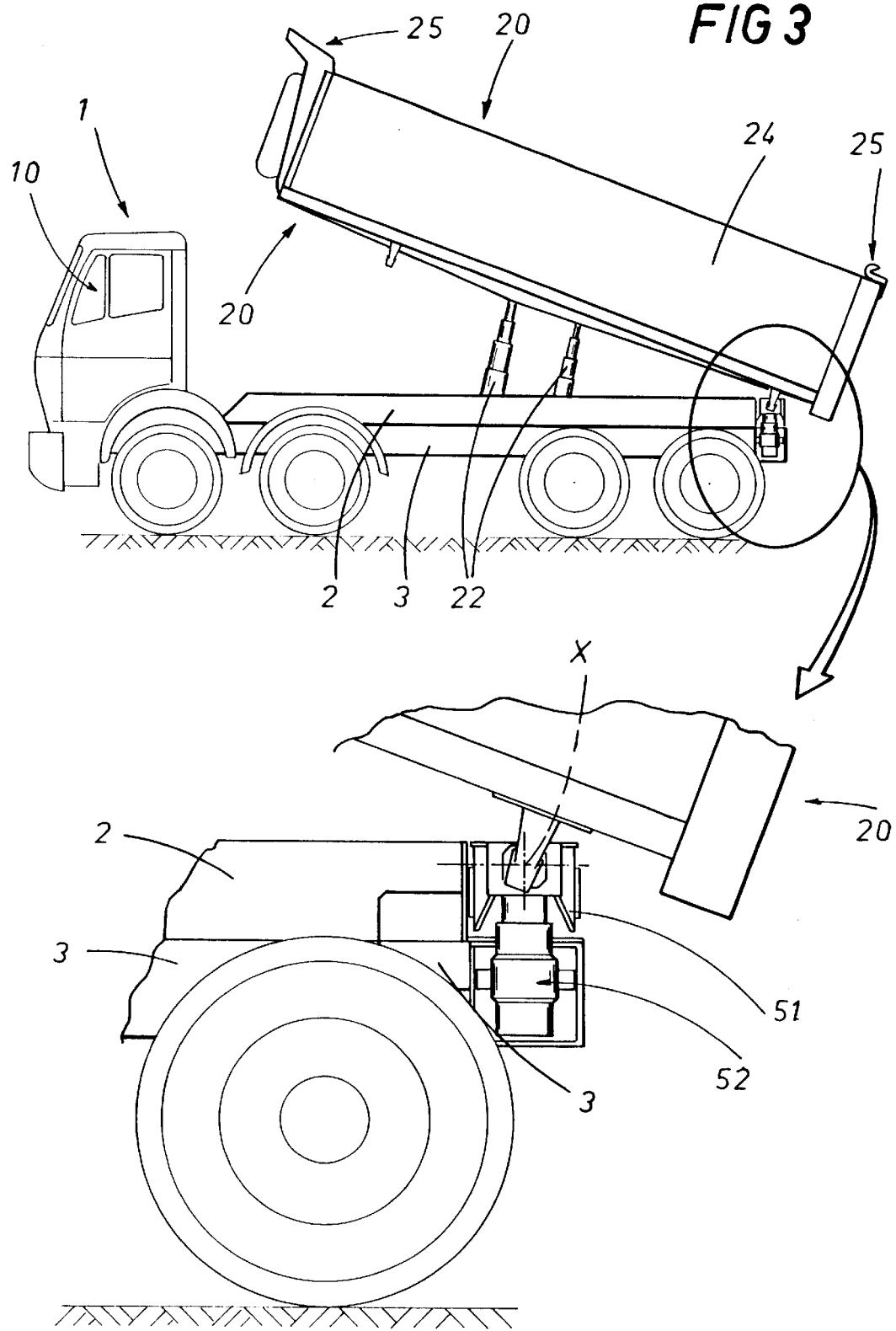

LEVELING SYSTEM FOR MOTOR VEHICLES

BACKGROUND OF THE INVENTION

The present invention relates to a levelling system for motor vehicles, applicable in particular to industrial vehicles with dump bodies.

A vehicle with a dump body has a frame connected to the wheels via the suspension and an auxiliary frame hinged to the frame at a hinge shaft usually located at the rear end of the vehicle.

When loose material such as soil, sand and so on needs to be dumped, one end of the body is raised until the angle between the body and the frame is sufficient to allow the material to slide off.

This operation may be carried out with the vehicle stationary but in most cases the vehicle is simultaneously driven forward slowly to facilitate the tipping out of the load.

When the vehicle, which may be a truck, a semitrailer or a trailer is on safe, solid ground, for example a flat, tarred surface, dumping operations are usually carried out safely and without problems.

When the ground the vehicle is standing on is not level, on the other hand, raising the body to dump the material being carried is difficult and may be very dangerous.

In fact, if the wheels of the vehicle, particularly the back wheels, do not have a sufficiently solid support, the vehicle tilts (and rolls about its longitudinal axis) placing more weight on one side of it than on the other.

Such situations are relatively frequent and make it difficult to manage the beginning of dumping operations. The solidity of the ground on which the vehicle has to work on is not always easy to judge since the vehicles concerned are used on building sites and landfills, where the surface is covered by a layer of loose material compacted to varying degrees.

For this reason, even if the wheels on the rear axle (or axles) may be perfectly level when the vehicle starts dumping, the increased weight bearing on the rear axle may cause the vehicle to gradually tilt to one side as the dumping operation proceeds. Although the tilt angle may be just a few degrees at the base, it is much greater at the top when the dump body is raised and leads to irregular dumping.

If the load to be dumped is wet soil or similar material, the dumping operation is even more critical; such materials, once the vehicle is tilted sideways, tend to come loose mainly on the side opposite the tilted side, thus making the load on the vehicle even more imbalanced by increasing the mass weighing down on one side of the axle.

As a result, the vehicle becomes much more unstable during dumping operations, creating an obvious hazard for the operator (driver) and the risk of damaging the vehicle itself.

Moreover, should the vehicle roll over completely, not only is the driver's life at risk but also the lives of any persons who may be working near the vehicle. Since the dump command is normally given from inside the cab, the drivers of the vehicles often have to work under very awkward conditions: in practice, a driver must dump the load, if necessary by inching the vehicle forward and stopping it alternately, without being able to check the real state of the load or to fully control the dumping operation and while being constantly on guard against the risk of rolling over.

At present, the stability of a vehicle during dumping operations, is guaranteed by the strength of the connection between the frame and auxiliary frame, which subjects the vehicle structure to considerable torsional strain.

For this reason, the frame and the auxiliary frame must be appropriately constructed but even a strong structure may be insufficient to prevent rolling over or damage in the event of abrupt yielding or subsidence of the ground under the vehicle wheels.

The aim of the present invention is to overcome the disadvantages mentioned above by providing a levelling system capable of keeping the shaft that hinges the body to the auxiliary frame substantially horizontal so as to allow loaded material to be safely and easily dumped.

SUMMARY OF THE INVENTION

The levelling system disclosed basically includes means for detecting the inclination of the hinge shaft between the dump body and the auxiliary frame to the horizontal and means for adjusting the inclination consisting of a pivoted lever or bracket placed between the supporting structure and the loading structure and operated by at least two variable extension elements on opposite sides of the pivot in accordance with the readings of the detecting means.

The levelling system disclosed may have an independent control system connected to the existing hydraulic system so as to form a self-contained unit or, in the case of new vehicles, it may be built into the vehicle's hydraulic lift system.

As mentioned above, the invention may be ideally applied to vehicles with dump bodies, be they lorries, semitrailers or trailers.

In one possible embodiment, the invention may be applied to vehicles with a loading surface, not necessarily a dump body, which is pivoted to an auxiliary frame and which must be kept substantially horizontal. As is better described below, this embodiment applies to so-called long vehicles used for transporting very long or wide loads such as prefabricated girders, to prevent undue torsional stress on the vehicle structures between the portion supported by a tractor and that supported by a trailer.

BRIEF DESCRIPTION OF THE DRAWINGS

Further characteristics and advantages of the invention are apparent from the detailed description which follows, with reference to the accompanying drawings, which illustrate preferred embodiments of the invention by way of example and in which:

FIG. 3 is a side view, with an enlarged detail, of an embodiment of the present invention fitted to a dump truck;

DESCRIPTION OF THE PREFERRED EMBODIMENTS

Figure 2:
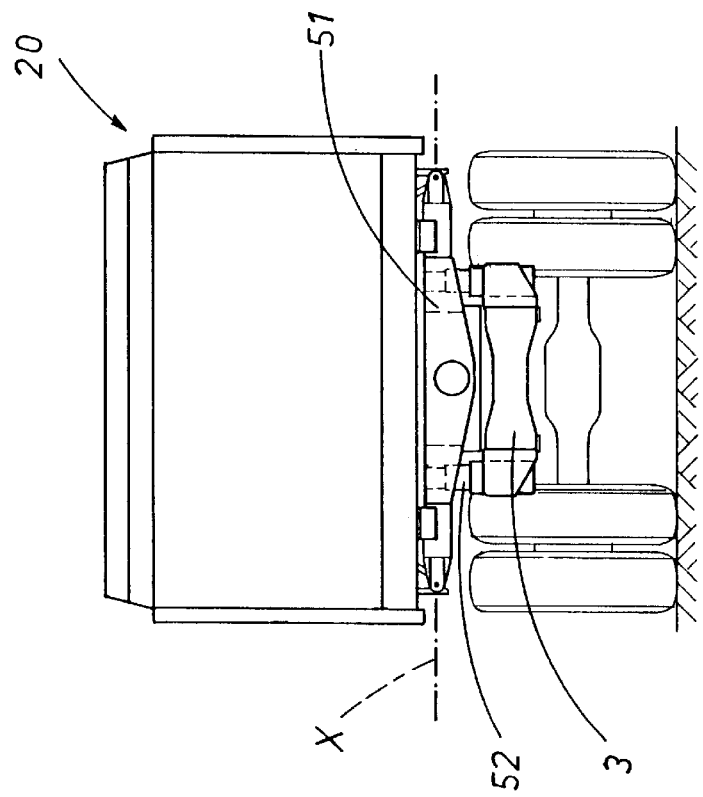
FIGS. 1 and 2 are full rear views of two vehicles equipped with the system disclosed and standing, respectively, on a gradient with the body raised and on level ground with the body lowered.
Figure 1:
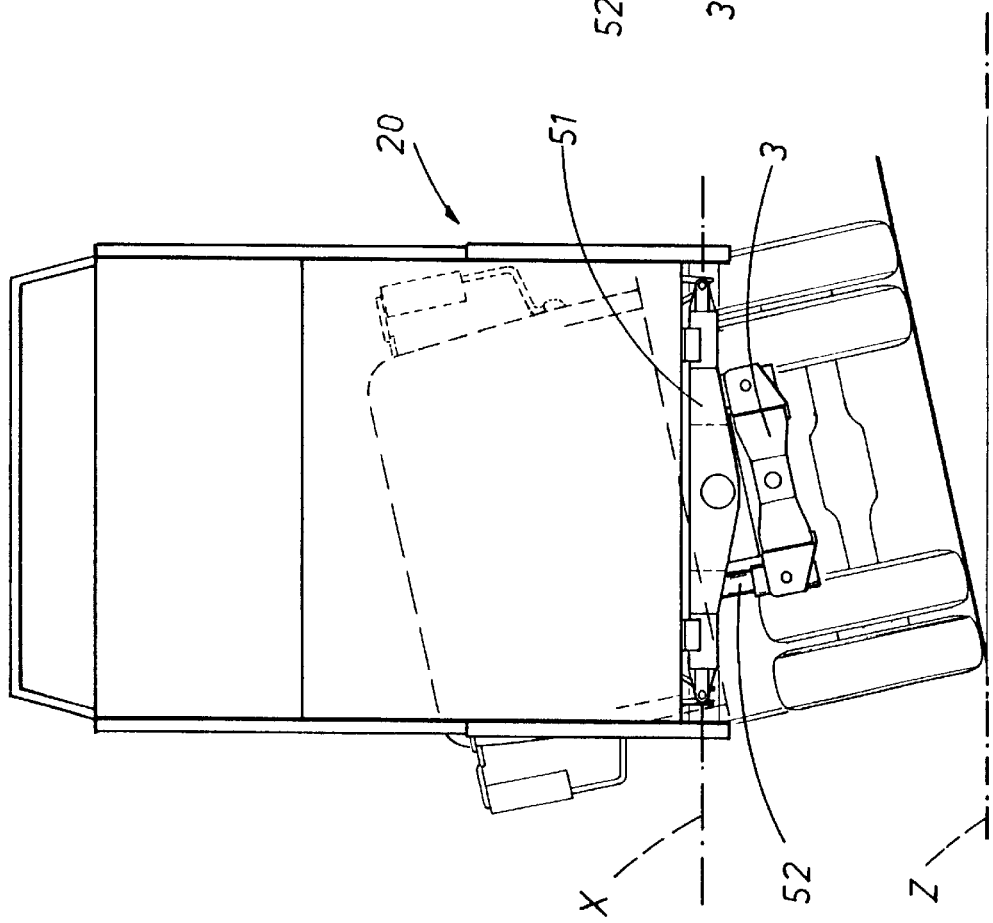

With reference to the drawings listed above, in particular the embodiments shown in FIGS. 1, 2, 3, 4 and 5, the levelling system for motor vehicles is used in particular for vehicles with dump bodies.

In the embodiments illustrated, the invention is applied to a truck 1 with a supporting frame 3 and an auxiliary frame that hinges to a body 20 at a shaft X placed at one end of the vehicle 1.

In other words, the vehicle has a loading structure, which, in the embodiments illustrated, is defined by the body 20 and a supporting structure (defined by the frame 3 and the auxiliary frame 2) hinged together to permit tipping.

To enable the dump body 20 to rotate about the hinge shaft X so as to dump the load, the system envisages lifting means defined, in the embodiment illustrated, by a pair of hydraulic cylinders 22.

Figure 4:
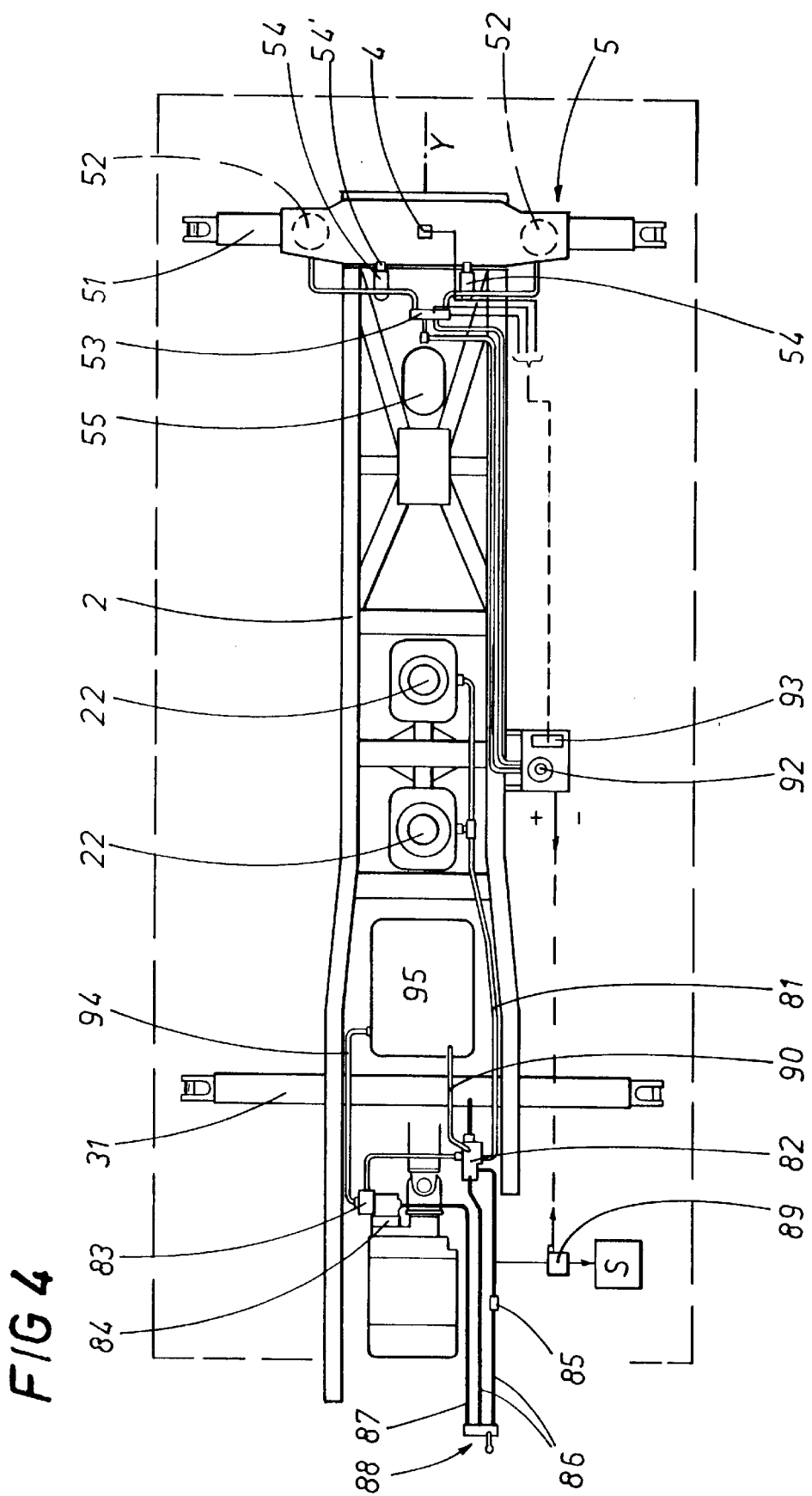
FIG. 4 shows a possible example of the connections used for the present invention together with a schematic plan view of a truck.

FIG. 4 shows more clearly the embodiment of the levelling system applied to a truck with a dump body having its own hydraulic circuit.

In addition to controlling the units represented schematically by the block S, the existing hydraulic circuit activates the cylinders 22 which raise the dump body 20.

The existing hydraulic circuit includes a pump 83 connected to the power take-off 84 of the vehicle. The pump 83 is connected through a suction pipe 94 to a main tank 95 containing the hydraulic oil needed for the operation of the existing hydraulic circuit.

The pump 83 may be operated by a control lever 88, normally located in the cab 10, in such a way as to activate a control valve 82 (through appropriate pipes 87 and 86) connected to the lift cylinders 22 through a pipe 81 and to the tank 95 through a discharge pipe 90.

The existing circuit includes a solenoid valve 89 which, as described below, allows a hydraulic controlling circuit of the levelling system disclosed to interact with the existing hydraulic circuit.

The levelling system includes means 4 for detecting the inclination of the first hinge shaft X to the horizontal and means 5 for adjusting the inclination.

The inclination detecting means may be an instrument consisting of an inclinometer or similar device, designed to provide an output signal, preferably electrical, in accordance with the detected inclination to the horizontal.

The means 5 for adjusting the inclination include at least one lever or bracket 51 placed between the frame 3, the auxiliary frame 2 and the body 20 and centrally pivoted on a substantially horizontal pin perpendicular to the first shaft X so as to define a second shaft Y joining the auxiliary frame 2 and the dump body 20.

In the embodiment illustrated, shown more clearly in the detail of FIG. 3, the bracket 51 is pivoted to the auxiliary frame 2 supporting the body 20 and connected to the frame 3 through at least two variable extension elements 52s and 52d.

Alternatively, in another embodiment of the invention, the bracket or lever 51 may be integral with the frame 3 and movable with respect to the auxiliary frame 2.

The variable extension elements 52 are placed opposite each other on both sides of the pin Y and are designed to modify the inclination of the bracket 51 to the frame 3 according to the readings taken by the inclination detecting means 4.

The variable extension elements consist of a pair of hydraulic actuators 52s and 52d (for example, hydraulic cylinders) controlled by a hydraulic circuit.

The control circuit of the variable extension elements 52 consists of a tank 55 and all the related piping, plus a control unit 93, which is connected at its input at least to the inclination detecting means 4 and at its output to a servovalve 53 connected to the variable extension elements 52, and which is designed to vary the extension of the variable extension elements 52 in accordance with the readings of the inclination detecting means 4.

In the embodiment described, since the levelling system is combined with an existing circuit, the hydraulic control circuit of the variable extension elements 52 is equipped with an electro-hydraulic motor 92.

As shown in FIG. 4, the hydraulic control circuit of the variable extension elements 52 is connected through control unit 93 and through the aforementioned servovalve 89 to the inclination detecting means 4 and to the existing control circuit of the cylinders 22.

In this way, it is possible to automatically lower the dump body 20 when its inclination to the horizontal exceeds a first defined angle. This operation corresponds to the stage labelled B in FIG. 5 where the block EV-22 indicates the possible activation of a solenoid valve connected to the lift cylinders 22.

Figure 5:
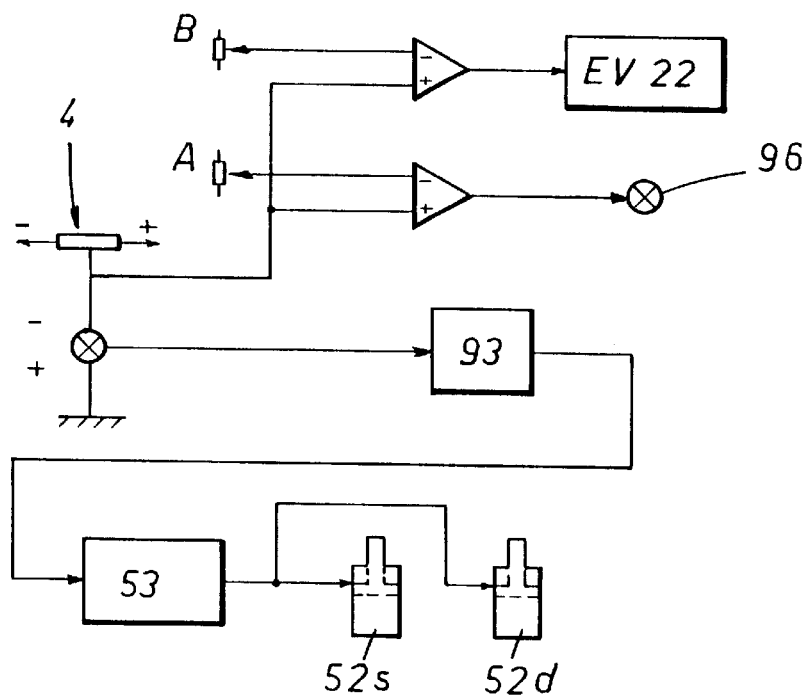
FIG. 5 is a wiring diagram of an embodiment of the present invention.

As shown in FIG. 5, the hydraulic control circuit of the variable extension elements 52 may include at least one warning device 96 (which may be a visual warning device as illustrated or an audible warning device or both). The warning device 96 is preferably located inside the cab 10 of the vehicle 1 so as to warn the driver when the inclination exceeds a second defined angle (stage A).

The bracket 51 may envisage means for stopping its rotation about the pin Y in such a way as to stop the corresponding rotation of the auxiliary frame 2 about the frame 3.

The stopping means may be constituted by the variable extension elements 52 themselves, in which case they must be of the type capable of self-locking under defined conditions when not operating. Alternatively, they may be constituted by at least one actuator 54 connected to a hydraulic circuit and having at least one end 54' that may be inserted into a corresponding seat made in the bracket 51, or by a vertical plate integral with it.

As a further safety measure, the hydraulic control circuit of the variable extension elements 52 may be connected to the inclination detecting means 4 and to a circuit controlling the locks 25 on the sides 24 of the body 20 so as to automatically open the sides 24 when the inclination exceeds a defined angle.

Figure 6:
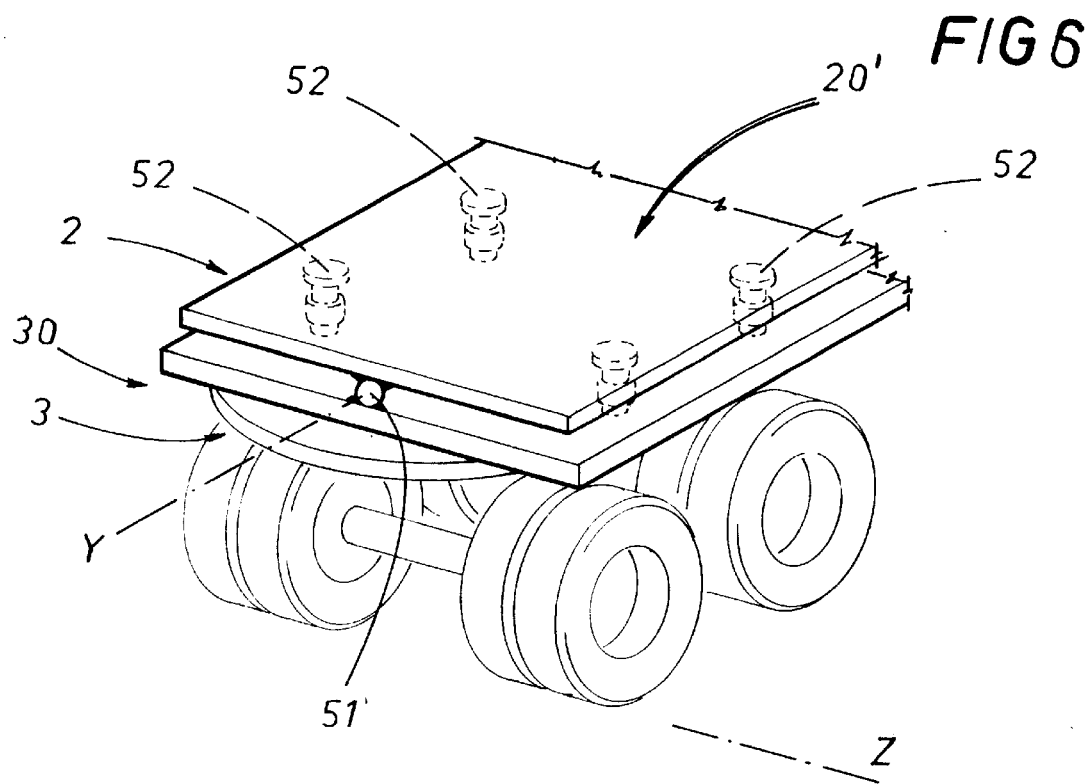
FIG. 6 is a partial, schematic perspective view of another embodiment of the present invention.

As mentioned earlier, another possible application is illustrated in FIG. 6 where the supporting structure 3 mounts a thrust bearing 30 on which there is a supporting surface 20'. Between the thrust bearing 30 and the supporting surface 20' there is envisaged (either directly or through other connecting structures) a connection that can rotate about a shaft Y placed longitudinally with respect to the vehicle.

The variable extension elements 52 are placed opposite each other on the peripheral portions of the supporting surface 20' so as to keep the load on the supporting surface in a substantially horizontal position.

This application may be used for thrust bearings which normally allow swinging motion in one direction only: the present invention can be used to make the thrust bearings "active" when they carry structures such as prefabricated girders. The system must be mounted on both tractor and trailer.

The invention described can be subject to modifications and variations without thereby departing from the scope of the inventive concept.

Moreover, all the details of the invention may be substituted by technically equivalent elements.

What is claimed:

1. A leveling system for vehicles comprising:
    a supporting structure for supporting a load to be carried by the vehicle;
    a loading structure for containing the load and being pivotally connected to the supporting structure to pivot about a first axis;
    means for pivoting the loading structure about the first axis to thereby deploy the load;
    the supporting structure including:
        a supporting frame secured to move with an axle of the vehicle;
        an auxiliary frame connected to the supporting frame;
        means for adjusting the inclination of the loading structure relative to the supporting structure about a second axis, substantially perpendicular to the first axis, the means for adjusting including at least two variable extension elements disposed on opposite sides of the second axis for pivoting the loading structure about the second axis;
    a lever pivotally connected to the auxiliary frame to rotate about the second axis, the loading structure being connected to the lever and the variable extension elements cooperating to pivot the lever; and,
    means for stopping the rotation of the lever so as to limit the pivoting movement thereof, said means for stopping comprising at least one of:
        i) extension elements that are self-locking, and,
        ii) an actuator connected to a hydraulic circuit and having an end that cooperates with a seat in the lever.

2. The leveling system according to claim 1, wherein the auxiliary frame is adapted to pivot with respect to the supporting frame about the second axis.

3. The leveling system according to claim 1 wherein the supporting structure includes a thrust bearing that permits the supporting structure to rotate with respect to the vehicle such that the second axis rotates within a plane.

4. The leveling system according to claim 1 wherein the variable extension elements are hydraulic actuators controlled by a hydraulic circuit.

5. The leveling system according to claim 4 wherein the variable extension elements are hydraulic cylinders.

6. A leveling system for a motor vehicle having a loading structure hinged at a first shaft to a supporting structure connected to wheels, the leveling system comprising:
    means for adjusting the inclination of the loading structure to the horizontal, including at least one lever placed between the supporting structure and the loading structure, pivoted on a substantially horizontal pin defining a second shaft joining the supporting structure to the loading structure, the lever being connected to the supporting structure through at least two variable extension elements placed opposite each other on both sides of the pin to adjust the inclination of the loading structure to the supporting structure in accordance with the inclination of the first shaft to the horizontal detected by detecting means on the vehicle,
    the supporting structure including an auxiliary frame and a supporting frame connected to the wheels of the vehicle, and means for driving the loading structure relative to the auxiliary frame so as to rotate the loading structure about the first shaft to allow a load of material in the loading structure to be tipped out, the lever being placed between the loading structure and the auxiliary frame, the horizontal pin being perpendicular to the first shaft so as to define the second shaft joining the loading structure to the auxiliary frame, to modify the inclination of the loading structure relative to the auxiliary frame according to the inclination to the horizontal of the first shaft detected by the detecting means;
    the leveling system further comprising a hydraulic control circuit for the variable extension elements connected to the detecting means and to a control circuit for the means for driving so as to automatically lower the loading structure when the inclination to the horizontal of the first shaft exceeds a defined angle.

7. A leveling system for a motor vehicle having a loading structure hinged at a first shaft to a supporting structure connected to wheels, the leveling system comprising:
    means for adjusting the inclination of the loading structure to the horizontal, including at least one lever placed between the supporting structure and the loading structure, pivoted on a substantially horizontal pin defining a second shaft joining the supporting structure to the loading structure, the lever being connected to the supporting structure through at least two variable extension elements placed opposite each other on both sides of the pin to adjust the inclination of the loading structure to the supporting structure in accordance with the inclination of the first shaft to the horizontal detected by detecting means on the vehicle,
    the supporting structure including an auxiliary frame and a supporting frame connected to the wheels of the vehicle, and means for driving the loading structure relative to the auxiliary frame so as to rotate the loading structure about the first shaft to allow a load of material in the loading structure to be tipped out, the lever being placed between the loading structure and the auxiliary frame, the horizontal pin being perpendicular to the first shaft so as to define the second shaft joining the loading structure to the auxiliary frame, to modify the inclination of the loading structure relative to the auxiliary frame according to the inclination to the horizontal of the first shaft detected by the detecting means;
    the leveling system further comprising a hydraulic control circuit for the variable extension elements connected to the detecting means and to a warning device located inside a cab of the vehicle to warn the driver when the inclination to the horizontal of the first shaft exceeds a defined angle.

8. A leveling system for a motor vehicle having a loading structure hinged at a first shaft to a supporting structure connected to wheels, the leveling system comprising:
    means for adjusting the inclination of the loading structure to the horizontal, including at least one lever placed between the supporting structure and the loading structure, pivoted on a substantially horizontal pin defining a second shaft joining the supporting structure to the loading structure, the lever being connected to the supporting structure through at least two variable extension elements placed opposite each other on both sides of the pin to adjust the inclination of the loading structure to the supporting structure in accordance with the inclination of the first shaft to the horizontal detected by detecting means on the vehicle,
    the supporting structure including an auxiliary frame and a supporting frame connected to the wheels of the vehicle, and means for driving the loading structure relative to the auxiliary frame so as to rotate the loading structure about the first shaft to allow a load of material in the loading structure to be tipped out, the lever being placed between the loading structure and the auxiliary frame, the horizontal pin being perpendicular to the first shaft so as to define the second shaft joining the loading structure to the auxiliary frame, to modify the inclination of the loading structure relative to the auxiliary frame according to the inclination to the horizontal of the first shaft detected by the detecting means;

wherein the lever further comprises means for stopping the rotation of the lever about the pin, the means for stopping including an actuator being connected to a hydraulic circuit and having at least one end that may be inserted into a seat in the lever.

9. A leveling system for a motor vehicle having a loading structure hinged at a first shaft to a supporting structure connected to wheels, the leveling system comprising:

means for adjusting the inclination of the loading structure to the horizontal, including at least one lever placed between the supporting structure and the loading structure, pivoted on a substantially horizontal pin defining a second shaft joining the supporting structure to the loading structure, the lever being connected to the supporting structure through at least two variable extension elements placed opposite each other on both sides of the pin to adjust the inclination of the loading structure to the supporting structure in accordance with the inclination of the first shaft to the horizontal detected by detecting means on the vehicle, the supporting structure including an auxiliary frame and a supporting frame connected to the wheels of the vehicle, and means for driving the loading structure relative to the auxiliary frame so as to rotate the loading structure about the first shaft to allow a load of material in the loading structure to be tipped out, the lever being placed between the loading structure and the auxiliary frame, the horizontal pin being perpendicular to the first shaft so as to define the second shaft joining the loading structure to the auxiliary frame, to modify the inclination of the loading structure relative to the auxiliary frame according to the inclination to the horizontal of the first shaft detected by the detecting means;

the leveling system further comprising a hydraulic control circuit for the variable extension elements connected to the detecting means and to a circuit controlling locks on sides of the loading structure so as to automatically open the sides of the loading structure when the inclination exceeds a defined angle.

10. A leveling system for vehicles comprising:

a supporting structure for supporting a load to be carried by the vehicle;

a loading structure for containing the load and being pivotally connected to the supporting structure to pivot about a first axis;

means for pivoting the loading structure about the first axis to thereby deploy the load;

the supporting structure including:
a supporting frame secured to move with an axle of the vehicle;
an auxiliary frame connected to the supporting frame;
means for adjusting the inclination of the loading structure relative to the supporting structure about a second axis, substantially perpendicular to the first axis, the means for adjusting including at least two variable extension elements disposed on opposite sides of the second axis for pivoting the loading structure about the second axis;

a sensor for providing an output signal corresponding to the inclination of the loading structure with respect to the horizontal; and, a control circuit for controlling the variable extension elements according to the output signal from the sensor, said control circuit operating to automatically lower the loading structure when the inclination of the loading structure about the second axis exceeds a defined angle.

11. A leveling system for vehicles comprising:

a supporting structure for supporting a load to be carried by the vehicle;

a loading structure for containing the load and being pivotally connected to the supporting structure to pivot about a first axis;

means for pivoting the loading structure about the first axis to thereby deploy the load;

the supporting structure including:
a supporting frame secured to move with an axle of the vehicle;
an auxiliary frame connected to the supporting frame;
means for adjusting the inclination of the loading structure relative to the supporting structure about a second axis, substantially perpendicular to the first axis, the means for adjusting including at least two variable extension elements disposed on opposite sides of the second axis for pivoting the loading structure about the second axis;

a sensor for providing an output signal corresponding to the inclination of the loading structure with respect to the horizontal; and, a control circuit for controlling the variable extension elements according to the output signal from the sensors, said control circuit cooperating with a warning device to warn an operator of the vehicle when the inclination of the loading structure about the second axis exceeds a defined angle.

12. A leveling system for vehicles comprising:

a supporting structure for supporting a load to be carried by the vehicle;

a loading structure for containing the load and being pivotally connected to the supporting structure to pivot about a first axis;

means for pivoting the loading structure about the first axis to thereby deploy the load;

the supporting structure including:
a supporting frame secured to move with an axle of the vehicle;
an auxiliary frame connected to the supporting frame;
means for adjusting the inclination of the loading structure relative to the supporting structure about a second axis, substantially perpendicular to the first axis, the means for adjusting including at least two variable extension elements disposed on opposite sides of the second axis for pivoting the loading structure about the second axis;

a sensor for providing an output signal corresponding to the inclination of the loading structure with respect to a horizontal plane; and, a control circuit for controlling the variable extension elements according to the output signal from the sensors, said control circuit cooperating with locks on sides of the loading structure to automatically open the sides of the loading structure when the inclination of the loading structure about the second axis exceeds a defined angle.

13. A leveling system for vehicles comprising:

a supporting structure for supporting a load to be carried by the vehicle;

a loading structure pivotally connected to the supporting structure to pivot about a first axis;

means for lifting an end of the loading structure from the supporting structure to tip the loading structure for dumping a load;

means for adjusting the angle of inclination of the loading structure relative to the supporting structure about a second axis substantially perpendicular to the fist axis including at least two variable extension elements placed on opposite sides of the second axis;

a sensor for providing an output signal corresponding to the inclination of the loading structure with respect to a horizontal plane; and, a control circuit for controlling the variable extension elements according to the output signal from the sensor, said control circuit adapted to perform at least one of: i) automatically lowering the loading structure when the inclination of the loading structure relative to the horizontal plane exceeds a defined angle, and ii) signaling a warning device for warning an operator of the vehicle when the inclination of the loading structure relative to the horizontal plane exceeds a defined angle.

14. A leveling system for vehicles comprising:

a supporting structure for supporting a load to be carried by the vehicle;

a loading structure pivotally connected to the supporting structure to pivot about a first axis;

means for lifting an end of the loading structure from the supporting structure to tip the loading structure for dumping a load;

means for adjusting the angle of inclination of the loading structure relative to the supporting structure about a second axis including at least two variable extension element placed on opposite sides of the second axis;

a sensor for providing an output signal corresponding to the inclination of the loading structure with respect to a horizontal plane; and, a control circuit for controlling the variable extension elements according to the output signal from the sensor; and, stopping means for selectively preventing operation of said means for adjusting the angle of inclination of the loading structure about the second axis, said stopping means comprising at least one of: i) self-locking extension elements, and ii) an actuator connected to a hydraulic circuit and having an end that cooperates with a seat in a lever connected to move with said loading structure.

15. A leveling system for vehicles comprising:

a supporting structure for supporting a load to be carried by the vehicle;

a loading structure pivotally connected to the supporting structure to pivot about a first axis;

means for lifting an end of the loading structure from the supporting structure to tip the loading structure for dumping a load;

means for adjusting the angle of inclination of the loading structure relative to the supporting structure about a second axis including at least two variable extension elements placed on opposite sides of the second axis;

a sensor for providing an output signal corresponding to the inclination of the loading structure with respect to a horizontal plane;

a control circuit for controlling the variable extension elements according to the output signal from the sensor; and, a hydraulic control circuit for the variable extension elements connected to the sensor, and a circuit for controlling locks on sides of the loading structure so as to automatically open the sides of the loading structure when the inclination of the loading structure exceeds a defined angle.

16. A leveling system for vehicles comprising:

a supporting structure for supporting a load to be carried by the vehicle;

a loading structure for containing the load and being pivotally connected to the supporting structure to pivot about a first axis; and, means for pivoting the loading structure about the first axis to thereby deploy the load, the supporting structure including:

a supporting frame secured to move with an axle of the vehicle;

an auxiliary frame connected to the supporting frame;

means for adjusting the inclination of the loading structure relative to the supporting structure about a second axis, substantially perpendicular to the first axis, the means for adjusting including at least two variable extension elements disposed on opposite sides of the second axis for pivoting the loading structure about the second axis;

a sensor for providing an output signal corresponding to the inclination of the loading structure with respect to a horizontal plane;

an actuation unit for actuating the variable extension elements; and, indicating means, using the output signal provided by the sensor, for indicating to an operator the inclination of the loading structure with respect to the horizontal plane about the second axis in such a way that the operator can actuate the actuation unit and restore a substantially horizontal orientation of the loading structure with respect to the second axis.

* * * * *